United States Patent
Neuhausen et al.

(12) 
(10) Patent No.: US 8,076,444 B2
(45) Date of Patent: Dec. 13, 2011

(54) CURABLE COMPOSITIONS CONSISTING OF SILANES WITH THREE HYDROLYSABLE GROUPS

(75) Inventors: Ulrich Neuhausen, Düsseldorf (DE); Daniela Braun, Shanghai (CN); Johann Klein, Düsseldorf (DE); Christiane Kunze, Köln (DE); Sara Gonzalez, Barcelona (ES); Lars Zander, Rommerskirchen (DE); Thomas Bachon, Düsseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 12/732,233

(22) Filed: Mar. 26, 2010

(65) Prior Publication Data

US 2010/0216950 A1    Aug. 26, 2010

Related U.S. Application Data

(63) Continuation of application No. PCT/EP2008/066038, filed on Nov. 21, 2008.

(30) Foreign Application Priority Data

Nov. 22, 2007 (DE) .......................... 10 2007 056 524

(51) Int. Cl.
*C08G 77/04* (2006.01)
(52) U.S. Cl. ............... 528/33; 528/25; 528/28; 528/29; 528/35; 528/45; 525/100; 525/393; 525/431; 525/446; 525/464; 525/477
(58) Field of Classification Search .................. 528/29
See application file for complete search history.

(56) References Cited

U.S. PATENT DOCUMENTS

| 4,345,053 | A | * | 8/1982 | Rizk et al. ................ 525/440.03 |
| 6,207,766 | B1 | * | 3/2001 | Doi et al. ..................... 525/403 |
| 2004/0074598 | A1 | * | 4/2004 | Ando et al. ................... 156/325 |

FOREIGN PATENT DOCUMENTS

| DE | 60221812 | | 4/2008 |
| DK | 27389 | | 5/1991 |
| DK | 28339 | | 5/1991 |
| EP | 0520426 | B1 | 4/1963 |
| EP | 0354472 | | 8/1989 |
| EP | 0931800 | | 10/2004 |
| EP | 1363960 | B1 | 10/2004 |
| EP | 1396513 | B1 | 9/2005 |
| WO | WO 00/04069 | | 1/2000 |
| WO | WO 02068501 | | 9/2002 |
| WO | WO 03059981 | | 7/2003 |

* cited by examiner

*Primary Examiner* — Marc Zimmer
*Assistant Examiner* — Lindsay Nelson
(74) *Attorney, Agent, or Firm* — Steven C. Bauman; James E. Piotrowski

(57) ABSTRACT

The invention relates to silane cross-linking curable compositions, comprising a polymer P with at least two terminal groups of the following formulae (I) and (II) $-A_m-K^1-SiXYZ$ (I), $-A_m-K^2-SiXYZ$ (II), and/or two polymers $P_1$ and $P_2$, the polymer $P_1$ having terminal groups of the following formula (I) $-A_m-K^1-SiXYZ$ (I), and the polymer $P_2$ having terminal groups of the following formula (II) $-A_m-K^2-SiXYZ$ (II). In said formulae, A represents a bivalent binding group $K^1$ and $K^2$ independently of one another represent a bivalent aliphatic hydrocarbon group with a main chain of between 1 and 6 carbon atoms, the hydrocarbon groups $K^1$, $K^2$ being different, X, Y and Z independently of one another represent a hydroxy group of a hydrolysable group and m stands for 0 or 1.

16 Claims, No Drawings

CURABLE COMPOSITIONS CONSISTING OF SILANES WITH THREE HYDROLYSABLE GROUPS

The present invention relates to silane-crosslinking, curable compositions, the production thereof and the use thereof in adhesives and sealants.

Polymer systems which possess reactive alkoxysilyl groups are known. In the presence of atmospheric moisture, these alkoxysilane-terminated polymers are already capable of condensing together at room temperature, with elimination of the alkoxy groups. Depending on the content of alkoxysilyl groups and their structure, mainly long-chain polymers (thermoplastics), relatively wide-mesh three-dimensional networks (elastomers) or highly crosslinked systems (thermosets) are formed.

The polymers generally have an organic backbone which carries the alkoxysilyl groups at the ends. The organic backbone can comprise, for example, polyurethanes, polyesters, polyethers etc.

For elastic bonding, adhesives are required which have high strengths on the one hand but on the other hand are also sufficiently elastic to be able to maintain the adhesive bond permanently. If the strength of the adhesive is increased, a reduction in the elastic properties usually occurs. Higher strength is usually achieved by increasing the crosslink density, which is associated with a simultaneous decrease in elasticity. This can be partially restored by adding plasticizer. However, larger proportions promote the migration of the plasticizer and ultimately impair the strength of the adhesive bond, which is generally undesirable.

The alkoxysilane-terminated polymers used in practice according to the prior art generally contain γ-alkoxysilyl groups, i.e. alkoxysilyl groups which are bonded to a backbone polymer via a propylene group and a binding group. These binders are often used as a replacement for NCO-terminated polyurethanes and display clear toxicological advantages for the processor since they do not contain isocyanates.

A more recent development involves binders which are cured by means of so-called dimethoxy compounds based on α-silanes. These comprise those alkoxysilane-terminated polymers which have a methylene unit between a binding group linking the polymer with the silyl function and the dimethoxyalkylsilyl group. These systems generally exhibit good elasticities but have very short processing times. For example, EP 1 363 960 B1 describes fast-curing, isocyanate-free, foamable mixtures with α-isocyanatosilane-terminated prepolymers having a high curing rate.

EP 1 396 513 B1 relates to mixed systems based on polyoxyalkylene prepolymers having trialkoxysilyl groups at one end and mono- or dialkoxysilyl groups at the other. Furthermore, mixtures of two polyoxyalkylene prepolymers are described wherein one has trialkoxysilyl groups and the other has di- or monoalkoxysilyl groups. These are produced by hydrosilylation, which requires long reaction times and does not run to completion with respect to the end groups of the prepolymers, so systems produced in this way exhibit residual tack which is perceived as disadvantageous.

The need therefore still exists for isocyanate-free compositions for the production of 1-pack or 2-pack foams, adhesives and sealants which have an acceptable cure time and exhibit particularly good elasticity and extensibility after curing. There is also the desire for an efficient synthesis route and for compositions that do not exhibit residual tack.

The object of the present invention is therefore to provide isocyanate-free crosslinkable compositions which exhibit high elasticity and good strength. Furthermore, a user-friendly cure time is desired.

Surprisingly, it has been found that silane-crosslinking compositions exhibit particularly high extensibility, elasticity and good durability (strength) of the adhesive bond with reasonable setting times if these are composed of polymers with two different trialkoxysilyl end groups or with two different silyl groups which each contain three hydrolyzable groups, the silyl groups substantially differing in the aliphatic hydrocarbon bridges between the silyl groups and the binding groups to the polymer backbone.

The present invention provides a curable composition encompassing a) a polymer P with at least two end groups of the following formulae (I) and (II)

and/or b) two polymers $P_1$ and $P_2$, wherein the polymer $P_1$ has end groups of the following formula (I)

and the polymer $P_2$ has end groups of the following formula (II)

wherein

A signifies a divalent binding group, $K^1$, $K^2$ independently of one another denote a divalent aliphatic hydrocarbon group which has a main chain of 1 to 6 carbon atoms, wherein the hydrocarbon groups $K^1$, $K^2$ are different, X, Y, Z independently of one another denote a hydroxy group or a hydrolyzable group, and m assumes the values 0 or 1.

The curable compositions according to the invention have particularly advantageous properties, in particular high elasticity, good extensibility and strength, not previously achieved by similar known isocyanate-free binders, combined with moderate cure times which permit good processability.

The term curable composition is understood to mean a substance or a mixture of several substances which can be cured by physical or chemical means. These chemical or physical means can consist for example in the input of energy in the form of heat, light or other electromagnetic radiation, but also by simply bringing into contact with atmospheric humidity, water or a reactive component.

The polymers P, $P_1$, $P_2$ have a polymer backbone with at least two end groups (I) and/or (II). Each end group (I), (II) encompasses a divalent binding group. The term divalent binding group A here is understood to mean a divalent chemical group which links the polymer backbone of the polymers P, $P_1$, $P_2$ with the hydrocarbon group $K^1$, $K^2$ of the end groups (I), (II).

The divalent binding group A can also be formed during the production of the polymers P, $P_1$, $P_2$, e.g. as a urethane group by the reaction of a polyether functionalized with hydroxy groups with an isocyanatodialkoxysilane. The divalent binding group here can be either distinguishable or non-distinguishable from structural features occurring in the polymer backbone forming the basis. The latter is the case for example when it is identical with the linking points of the repeating units of the polymer backbone.

In cases in which the divalent binding group A is distinguishable from functional groups of the polymer structure of P, $P_1$ or $P_2$ that may be present, m corresponds to a value of 1. If the divalent binding group A does not differ from the functional groups of the polymer structure, m corresponds to a value of 0.

$K^1$, $K^2$ are divalent aliphatic hydrocarbon groups. This is understood to mean a straight-chained or branched, saturated or unsaturated alkylene group with a main chain of 1 to 6 carbon atoms, preferably methylene, ethylene or propylene. If $K^1$ and/or $K^2$ are present in branched form, the main chain is preferably branched at only one of the carbon atoms. $K^1$ and $K^2$ are different.

According to a preferred embodiment of the composition according to the invention, $K^2$ has a main chain at least one carbon atom longer than $K^1$.

Aliphatic carbon chains, particularly with single bonds, possess a highly mobile structure which contributes to the elastic properties of the compositions according to the invention. Precisely at the reactive ends of the silane-crosslinking polymers it is particularly advantageous to use polymers with different end groups which also differ in the length of the carbon chain along the main chain in the residue $K^1$, $K^2$. In this way, the curing rate and the extensibility of the composition can be varied to a large extent.

According to another preferred embodiment of the composition according to the invention, $K^1$ denotes $—CH_2—$.

Such compounds exhibit high reactivity of the terminating silyl groups, which contributes to reducing the setting and cure times.

According to another preferred embodiment of the composition according to the invention, $K^2$ denotes $—(CH_2)_3—$.

If a propylene group is chosen for $K^2$, these compounds exhibit particularly high flexibility. This property is attributed to the longer bonding carbon chain between divalent binding group A and terminating silyl group, since methylene groups are generally flexible and mobile.

Preferably, $K^1$ denotes methylene groups and $K^2$ propylene groups. In this way it is possible to prepare compositions according to the invention which offer the desired balanced ratio of good reactivity, i.e. crosslinking rate, and reasonable processing time and, as an adhesive bond, are highly elastic, flexible and yet strong.

Particularly preferred are compositions according to the invention in which $K^1$ denotes a methylene group and $K^2$ a propylene group and these are present as components of the end groups (I) and (II) on the same polymer P. Such polymers are highly elastic and extensible and additionally exhibit good strengths, low moduli and reasonable setting and cure times.

Most particularly preferred are compositions according to the invention which contain in total at least three differently functionalized polymers, i.e. a polymer P which has two different end groups (I) and (II), another polymer $P_1$ which has end groups (I) and a third polymer $P_2$ which has end groups (II).

Compositions of this type exhibit even higher elasticity and at the same time acceptable strength. The values that can be achieved with a composition of this type in terms of elasticity and ultimate tensile strength are significantly higher than for mixtures of the individual components $P_1$ and $P_2$.

According to another preferred embodiment of the composition according to the invention, X, Y and Z each denote a hydrolyzable group selected from $—Cl$, $—O—C(=O)R^1$, $—OR^1$, wherein $R^1$ denotes a hydrocarbon residue with 1 to 20 C atoms.

As X and Y it is preferable to select alkoxy groups, i.e. $—OR^1$. This is particularly advantageous since no substances that irritate the mucous membranes are released during the curing of these compositions. The alcohols that form are harmless in the quantities released, and evaporate. These compositions are therefore particularly suitable for the DIY sector. X and Y can denote the same or different functional groups.

According to another preferred embodiment, $R^1$ denotes $—CH_3$ or $—C_2H_5$.

Compounds with alkoxysilyl groups exhibit different reactivities in chemical reactions depending on the nature of the residues $R^1$. Among the alkoxy groups, the methoxy group exhibits the highest reactivity, and higher aliphatic residues such as ethoxy and branched or cyclic residues such as cyclohexyl bring about markedly low reactivity of the terminal alkoxysilyl group.

While it is true that strongly electronegative groups, such as e.g. a chloride or acyloxy group, impart higher reactivity to the terminal silyl group than less electronegative groups such as e.g. alkoxy groups, however, they release irritant substances during curing, which are perceived as unpleasant. In applications where the release of such substances is acceptable, fast-curing systems can thus be produced with the aid of chloride or acyloxy groups. It is also possible to increase the rate of reaction of polymers with longer hydrocarbon chains in $K^1$ or $K^2$ with the aid of these substituents. In this way, the elasticity and rate of reaction of the compounds can be controlled.

Furthermore, X, Y and Z can be selected such that the residues X, Y and Z on the same alkoxysilyl group are different. Preferably methoxy is selected for X and ethoxy for Y. Z can then be methoxy or ethoxy. This selection makes it possible to adjust the desired reactivity of the terminal silyl groups particularly finely in the event that the pure silyl groups carrying methoxy groups are perceived as too reactive and the silyl groups carrying ethoxy groups as too inactive for the intended application.

According to another preferred embodiment of the composition according to the invention, X, Y and Z are the same. As a result, the end groups (I) and (II) differ only in the form of the divalent hydrocarbon group $K^1$ or $K^2$, so that the synthesis of the polymers P, $P_1$ and $P_2$ is simplified. In addition, these compositions according to the invention can be processed into more homogeneous products.

According to another preferred embodiment of the composition according to the invention, the divalent binding group A signifies an amide, carbamate, urea, imino, carboxy, carbonate, thio, mercapto or sulfonate group or an oxygen or nitrogen atom, particularly preferably a urethane group.

These divalent binding groups can be formed e.g. during the production of the polymers P, $P_1$, $P_2$ by reaction of a backbone polymer with reactive compounds which carry the end groups (I), (II). In this case the compositions according to the invention preferably contain urethane groups as divalent binding groups, since during the production of the composition according to the invention a polymer backbone with terminal hydroxy groups and, as compounds carrying reactive end groups, isocyanatosilanes or isocyanato-functional alkoxysilanes are used.

According to another preferred embodiment of the composition according to the invention the polymers P, $P_1$, $P_2$ each have a polymer backbone which is selected in each case from alkyd resins, (meth)acrylates and (meth)acrylamides and their salts, phenolic resins, polyalkylenes, polyamides, polycarbonates, polyols, polyethers, polyesters, polyurethanes, vinyl polymers, siloxanes and copolymers consisting of at least two of the aforementioned classes of polymers.

Polyols, polyesters and polyurethanes, in particular polyethylene oxide and/or polypropylene oxide, are particularly preferably used.

The use of polyurethanes and polyesters opens up a wide variety of applications because, depending on the selection and stoichiometric ratios of the starting substances, very different mechanical properties can be achieved with the two classes of polymers. In addition, polyesters can be decomposed by water and bacteria and are therefore of interest for applications in which biodegradability is important.

Polyols which contain polyether as the polymer backbone have a flexible and elastic structure not only at the end groups but also in the polymer backbone. Thus it is possible to produce compositions which again exhibit improved elastic properties. Polyethers are not only flexible in their backbone but at the same time strong. Thus, polyethers are not attacked or decomposed by water and bacteria, for example, in contrast to polyesters, for example.

In the context of the present invention it is particularly preferred to use polyethers based on polyethylene oxide and/or polypropylene oxide for reasons of availability and because of their excellent elastic properties.

According to a particularly preferred embodiment of the composition according to the invention, the polymers P, $P_1$, $P_2$ have a polyether or polyurethane backbone and the binding group A is a urethane or urea group.

According to another preferred embodiment of the composition according to the invention, the molecular weight $M_n$ of the polymer backbone is between 3000 and 50,000 g/mol. Other particularly preferred molecular weight ranges are 5,000 to 25,000 g/mol, more particularly preferably 8,000 to 19,000 g/mol, most particularly 12,000 to 15,000 g/mol.

These molecular weights are particularly advantageous since compositions with these molecular weights have viscosities that facilitate processing. Furthermore, the compositions have a balanced ratio of viscosity (ease of processability), strength and elasticity. This combination is very advantageously pronounced in a molecular weight range of 8,000 to 18,000, particularly of 8,000 to 12,000.

Polyoxyalkylenes, particularly polyethylene oxides or polypropylene oxides having a polydispersity PD of less than 2, preferably less than 1.5, are most particularly preferably used.

The term molecular weight $M_n$ is understood as the number-average molecular weight of the polymer. Like the weight-average molecular weight $M_w$, this can be determined by gel permeation chromatography (GPC, also: SEC). This method is known to the person skilled in the art. The polydispersity is derived from the average molecular weights $M_w$ and $M_n$. It is calculated as $PD=M_w/M_n$.

Particularly advantageous viscoelastic properties can be achieved by using polyoxyalkylene polymers having a narrow molar mass distribution and thus low polydispersity as polymer backbones. These can be produced e.g. by so-called double metal cyanide catalysis (DMC catalysis). These polyoxyalkylene polymers are distinguished by a particularly narrow molar mass distribution, by a high average molar mass and by a very small number of double bonds at the ends of the polymer chains.

Such polyoxyalkylene polymers have a polydispersity PD ($M_w/M_n$) of no more than 1.7.

Particularly preferred organic backbones are e.g. polyethers with a polydispersity of about 1.01 to about 1.3, particularly about 1.05 to about 1.18, for example about 1.08 to about 1.11 or about 1.12 to about 1.14.

In a preferred embodiment of the invention, these polyethers have an average molecular weight ($M_n$) of about 5 000 to about 30 000, particularly about 6000 to about 25 000. Particularly preferred are polyethers with average molecular weights of about 10 000 to about 22 000, in particular with average molecular weights of about 12 000 to about 18 000.

It is also conceivable to use polymers with a higher molecular weight. If the viscosity of the composition according to the invention is higher than desired because of a high molecular weight, for example, or strong internal binding forces, the processing viscosity can be adjusted by adding reactive thinners or plasticizers, thus producing a preparation having the desired properties.

According to the invention, it is also possible to use mixtures of several polymers having different molecular weights $M_n$ instead of pure polymers. In this case, the statements regarding polydispersity and the molecular weight $M_n$ are to be understood such that each of the polymers on which the mixture is based advantageously has a polydispersity in the preferred range, but the preferred molecular weight ranges relate to the value averaged over the entire mixture of polymers used.

The present invention also provides a method for the production of a curable composition, in which
a) a polymer P' with a polymer backbone having at least two terminal functional groups C and
b) two compounds with functional groups D, which are reactive towards C, of general formulae (III) and (IV),

$$D—K^1—SiXYZ \quad (III)$$

$$D—K^2—SiXYZ \quad (IV),$$

are reacted together,
wherein the substances (III) and (IV) are added to the polymer P' simultaneously during the reaction or
first compound (IV) is added and then, at a short interval, compound (III),
wherein C and D are selected from one of the groups
—OH, —$NHR^2$, —$NH_2$, —Cl, —Br, —SH and
—NCO, —NCS, —C(=O)Cl, —C(=O)$OR^3$
and C and D do not belong to the same group,
$K^1$, $K^2$ independently of one another denote a divalent aliphatic hydrocarbon group which has a main chain of 1 to 6 carbon atoms, wherein the hydrocarbon groups $K^1$, $K^2$ are different,
X, Y, Z independently of one another denote a hydroxy group or a hydrolyzable group, and
$R^2$, $R^3$ each independently of one another denote a hydrocarbon residue with 1 to 20 C atoms.

For the production of the polymers P' and P''', in principle all polymers possessing at least two terminal functional groups C are suitable. It is preferable to use alkyd resins, acrylates and methacrylates, acrylamides and methacrylamides, phenolic resins, polyalkylenes, polyamides, polycarbonates, polyols, polyethers, polyesters, polyether esters, polyurethanes, vinyl polymers and copolymers of at least two of the aforementioned classes of polymers. In addition, all the polymers described above as the polymer backbone of the polymers P, $P_1$ and $P_2$ are suitable.

Polyoxyalkylenes, i.e. polyethers, are particularly preferably used, since these are also flexible but at the same time strong in their backbone. Thus, in contrast to polyesters, for example, polyethers are not normally attacked or decomposed by water and bacteria.

Most particularly preferred are polyethylene oxide or polypropylene oxide, particularly those having a polydispersity of less than 2, preferably less than 1.5.

The terminal groups C can be derived for example from the repeating unit of the selected backbone polymer, i.e. they can be functional groups of the monomer making up the polymer P', P''', be introduced by re-functionalization of end groups C of the polymer backbone or be present as additional functional groups. Suitable as groups C here are all functional groups that are capable of a bond formation.

Two compounds (III) and (IV) which have groups D that are reactive with C are used as additional components in the methods according to the invention. All functional groups that can be linked with the functional groups C of the polymer P' or P''' are conceivable as groups D here.

The functional groups C and D are each preferably selected from one of the following two groups, the functional groups C and D not being taken from the same groups in the method according to the invention.

Group I: hydroxy (—OH); amino (—NH$_2$); secondary amino (—NHR); halogen groups, such as e.g. chloride (—Cl) or bromide (—Br); sulfanyl (—SH);

Group II: isocyanato (—NCO, also: isocyanate), isothiocyanato (—NCS), acylchloro (—C(=O)Cl), ester (—C(=O)OR); sulfonic acid (—SO$_3$H); sulfonyl chloride (—SO$_3$Cl); ethylenically unsaturated groups.

It is part of the general specialist knowledge here to make an appropriate selection such that the groups C and D can react with one another.

Thus, for example, to react with a polymer P' or P''' the functional groups C of which are halogen, hydroxy, amino or sulfanyl groups, compounds (III), (IV) with groups D selected from acylchloro, isocyanato, thioisocyanato and ester groups are particularly preferably suitable, most particularly preferably isocyanato groups.

It is also conceivable to select the groups C from acylchloro, isocyanato, thioisocyanato and ester groups and the groups D from halogen, hydroxy, amino or sulfanyl groups.

If an NCO group is selected as group D, the following isocyanatosilanes or isocyanato-functional alkoxysilanes can preferably be used: trimethoxysilyl methyl isocyanate, triethoxysilyl methyl isocyanate, trimethoxysilyl ethyl isocyanate, triethoxysilyl ethyl isocyanate, trimethoxysilyl propyl isocyanate, triethoxysilyl propyl isocyanate, trimethoxysilyl butyl isocyanate, triethoxysilyl butyl isocyanate, trimethoxysilyl pentyl isocyanate, triethoxysilyl pentyl isocyanate, trimethoxysilyl hexyl isocyanate, triethoxysilyl hexyl isocyanate.

Particularly preferred are trimethoxysilyl methyl isocyanate, triethoxysilyl methyl isocyanate, trimethoxysilyl propyl isocyanate and trimethoxysilyl propyl isocyanate.

As co-reactants for compounds in which isocyanate groups were selected as groups D, polyols and polyamines, particularly polyethylene and polypropylene glycols, are particularly preferably suitable.

The methods according to the invention for the production of the composition according to the invention can be carried out in two variants.

In a first method, a polymer P' having at least two terminal functional groups C is reacted with two compounds having groups D which are reactive towards C. The polymer P' and the two compounds with the general formulae (III) and (IV) are added together simultaneously, optionally adding catalysts, solvents and other additives, and reacted together with stirring. Consequently, the reaction can be carried out easily in a one-pot process and can readily be conducted in large batches.

Alternatively, a polymer P' and optionally catalysts, solvents and other additives can be initially charged and in a first step the compound (IV) can be stirred in during the reaction, followed at a short interval by the compound (III).

This procedure can advantageously be selected if the intention is to establish especially preferred reaction conditions. If, for example, a polymer P with the end groups (I) and (II), as described in the main claim, is to be produced and if for example the compound (III) is distinguished by considerably higher reactivity than the compound (IV), it is possible in this way to achieve a more uniform reaction of the compounds (III) and (IV) with the polymer P', the term uniform being intended to mean that the number of end groups (I) and (II) in the polymer P in question should be similar after the reaction. This method can also be carried out as a one-pot process.

If the compounds (II) and (IV) are added at a short interval, this is intended to mean that first the compound (IV) is fed into the reaction and then the compound (III).

A short interval is intended to mean a time period between immediately following one another and a few minutes' time delay. Between the additions of the two compounds, therefore, there can be a period of 1, 2, 5, 10, 15, 20 or 30 minutes. A short interval is preferably 5 to 15 minutes.

The present invention also provides a method for the production of a curable composition, in which firstly a) a polymer P' with a polymer backbone having at least two terminal functional groups C is reacted with the compound (III)

separately therefrom b) a polymer P''' with a polymer backbone having at least two terminal functional groups C is reacted with compound (IV)

and c) the reaction products from step a) and step b) are then mixed together, wherein C and D are selected from one of the groups

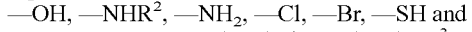
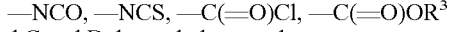

and C and D do not belong to the same group, $K^1$, $K^2$ independently of one another denote a divalent aliphatic hydrocarbon group having a main chain of 1 to 6 carbon atoms, wherein the hydrocarbon groups $K^1$, $K^2$ are different, X, Y and Z independently of one another denote a hydroxy group or a hydrolyzable group and $R^2$, $R^3$ each independently of one another denote a hydrocarbon residue with 1 to 20 C atoms.

In this method it is possible to react either two polymers P' and P''', or preferably two batches of the same polymer P', with the compounds (III) and (IV). In this case the reaction and the selection of suitable components takes place in accordance with the following statements, with the difference that per polymer P', P''' or per batch P' only one compound (III) or (IV) is used in each case.

The two reactions are carried out separately. Afterwards, the reaction products, polymers $P_1$ and $P_2$, thus obtained are mixed together.

The polymers $P_1$ and $P_2$ can each be introduced into the mixture in equal proportions but also in different proportions, but a mixing ratio of polymer $P_1$ and polymer $P_2$ of between 2:1 and 1:2, preferably 1.5:1 and 1:1.5, is preferred.

For the production of the polymers $P_1$ and $P_2$ by this method, in principle all polymers P' which possess at least two terminal functional groups C are suitable. Alkyd resins, acrylates and methacrylates, acrylamides and methacrylamides, phenolic resins, polyalkylenes, polyamides, polycarbonates, polyols, polyethers, polyesters, polyether esters, polyurethanes, vinyl polymers and copolymers of at least two of the aforementioned classes of polymers are preferably used here. In addition, all the polymers described above as the polymer backbone of the polymers P, $P_1$ or $P_2$ are suitable.

Polyoxyalkylenes, i.e. polyethers, are particularly preferably used, since these are also flexible in their backbone but at the same time strong. Thus, polyethers are not normally attacked or decomposed by water and bacteria, in contrast to polyesters, for example.

Most particularly preferred are polyethylene oxide or polypropylene oxide, particularly those having a polydispersity of less than 2, preferably less than 1.5.

The terminal groups C can be derived for example from the repeating unit of the selected backbone polymer, i.e. they can be functional groups of the monomer making up the polymer P', P''', be introduced by re-functionalization of end groups C of the polymer backbone, or be present as additional functional groups. Suitable as groups C here are all functional groups that are capable of a bond formation.

Two compounds (III) and (IV) which have groups D that are reactive with C are used as additional components in the methods according to the invention. All functional groups that can be linked with the functional groups C of the polymer P' or P''' are conceivable as groups D here.

The functional groups C and D are each preferably selected from one of the following two groups, the functional groups C and D not being taken from the same groups in the method according to the invention.

Group I: hydroxy (—OH); amino-(—NH$_2$); secondary amino (—NHR); halogen groups, such as e.g. chloride (—Cl) or bromide (—Br); sulfanyl (—SH);

Group isocyanato (—NCO, also: isocyanate), isothiocyanato (—NCS), acylchloro (—C(═O)Cl), ester (—C(═O)OR); sulfonic acid (—SO$_3$H); sulfonyl chloride (—SO$_3$Cl); ethylenically unsaturated groups.

It is part of the general specialist knowledge here to make an appropriate selection such that the groups C and D can react with one another.

Thus, for example, to react with a polymer P' or P''' the functional groups C of which are halogen, hydroxy, amino or sulfanyl groups, compounds (III), (IV) with groups D selected from acylchloro, isocyanato, thioisocyanato and ester groups are particularly preferably suitable, most particularly preferably isocyanato groups.

It is also conceivable to select the groups C from acylchloro, isocyanato, thioisocyanato and ester groups and the groups D from halogen, hydroxy, amino or sulfanyl groups.

If an NCO group is selected as group D, the following isocyanatosilanes can preferably be used: trimethoxysilyl methyl isocyanate, triethoxysilyl methyl isocyanate, trimethoxysilyl ethyl isocyanate, triethoxysilyl ethyl isocyanate, trimethoxysilyl propyl isocyanate, triethoxysilyl propyl isocyanate, trimethoxysilyl butyl isocyanate, triethoxysilyl butyl isocyanate, trimethoxysilyl pentyl isocyanate, triethoxysilyl pentyl isocyanate, trimethoxysilyl hexyl isocyanate, triethoxysilyl hexyl isocyanate.

Particularly preferred are trimethoxysilyl methyl isocyanate, triethoxysilyl methyl isocyanate, trimethoxysilyl propyl isocyanate and trimethoxysilyl propyl isocyanate.

As co-reactants for compounds in which isocyanate groups were selected as groups D, polyols and polyamines, particularly polyethylene and polypropylene glycols, are particularly preferably suitable.

Furthermore, the methods according to the invention can be carried out in the presence of catalysts. In the event that e.g. hydroxy or amino groups are present as group C and isocyanate groups as group D or isocyanate groups for group C and hydroxy or amino groups for group D, all catalysts known from polyurethane production can be used.

The catalysts usually used in the context of such polyurethane production include, for example, strongly basic amides such as 2,3-dimethyl-3,4,5,6-tetrahydropyrimidine, tris(dialkylaminoalkyl)-s-hexahydrotriazines, e.g. tris(N,N-dimethylaminopropyl)-s-hexahydrotriazine or the conventional tertiary amines, e.g. triethylamine, tributylamine, dimethylbenzylamine, N-ethyl-, N-methyl-, N-cyclohexylmorpholine, dimethylcyclohexylamine, dimorpholino diethyl ether, 2-(dimethylaminoethoxy)ethanol, 1,4-diazabicyclo[2.2.2]octane, 1-azabicyclo[3.3.0]octane, N,N,N',N'-tetramethylethylenediamine, N,N,N',N'-tetra-methylbutanediamine, N,N,N',N'-tetramethylhexanediamine-1,6, pentamethyl-diethylenetriamine, tetramethyldiaminoethyl ether, bis(dimethylaminopropyl)urea, N,N'-dimethylpiperazine, 1,2-dimethylimidazole, di-(4-N,N-dimethylamino-cyclohexyl) methane and the like, as well as organic metal compounds such as titanates, iron compounds such as e.g. iron(III) acetylacetonate, tin compounds, e.g. tin(II) salts of organic carboxylic acids, for example tin(II) diacetate, the tin(II) salt of 2-ethylhexanoic acid (tin(II) octoate), tin(II) dilaurate or the dialkyltin(IV) salts of organic carboxylic acids, such as e.g. dibutyltin(IV) diacetate, dibutyltin(IV) dilaurate (DBTL), dibutyltin(IV) maleate or dioctyltin(IV) diacetate or the like, as well as dibutyltin(IV) dimercaptide or mixtures of two or more of the above-mentioned As catalysts for control of the curing rate of the as well as mixtures of strongly basic amines and organic metal compounds are used.

Particularly preferred are bismuth catalysts as these promote the linking of the groups C and D to form urethane and isocyanurate groups, but an activation of the silyl groups, particularly of the alkoxysilyl groups, and thus premature curing, does not take place.

As bismuth catalysts it is possible to use bismuth carboxylates, for example bismuth (2-ethylhexanoate), bismuth neodecanoate, bismuth tetramethylheptanedionate, bismuth(II) diacetate, bismuth(II) dilaurate or the dialkyl bismuth(IV) salts, e.g. dibutylbismuth(IV) diacetate, dibutylbismuth(IV) dilaurate, dibutylbismuth(IV) maleate or dioctylbismuth(IV) diacetate or the like, as well as dibutylbismuth(IV) dimercaptide or mixtures of two or more of the above-mentioned catalysts.

The catalysts can be used in conventional quantities, for example about 0.002 to about 5 wt. %, based on the polyalcohols.

According to another preferred embodiment of the methods according to the invention, these are carried out at elevated temperature, particularly in a range of between 60 and 100° C., particularly preferably between 75 and 85° C.

Advantageously, the reaction can be accelerated or possibly even initially set in motion by increasing the temperature.

Furthermore, the reaction can be carried out under reduced pressure, i.e. in a partial vacuum. A pressure of between 10 and 1000 Pa is preferably established. In this way, any by-products forming during the reaction, particularly low-molecular-weight compounds with a molecular weight below 200 g/mol, particularly water or ammonia, can be removed from the reaction. This enables higher purity of the reaction product P, $P_1$ or $P_2$ to be achieved. In addition, it is possible to achieve a higher degree of conversion in this way, i.e. a higher efficiency of the reaction.

It is also conceivable to carry out the methods according to the invention at elevated temperature and under reduced pressure. This enables the reaction to be accelerated while at the same time achieving higher purity of the reaction product.

According to another preferred embodiment of the method according to the invention, the ratio of functional groups D to functional groups C is between 3:1 and 1:1.

It has proved advantageous to use the compounds with the functional groups D, which are reacted with the terminal functional groups C of the polymer P' or P''', in an excess with respect to the number of functional groups. As a result, a higher degree of conversion can be achieved in relation to the groups C of P' or P'''. If functional groups D are still present in the reaction product after the reaction, the substances with these groups can be removed by common methods, such as e.g. distillation or extraction. In addition, an excess of functional groups D can be removed by adding low-molecular-weight compounds which also react with the groups D. For this purpose it is possible to use low-molecular-weight compounds that contain the groups C described above. The term low-molecular-weight compounds here means those having a molecular weight of less than 200 g/mol. For example, methanol or ethanol can be used if D denotes NCO.

During the reaction of the polymers P' and P''', their end groups C react with the groups D of the compounds (III) or (IV) to form the divalent binding groups A to the polymers P, $P_1$, $P_2$. The so-called divalent binding group A here usually differs from the structural features of the polymers $P_1$ and $P_2$, which as a rule also contain functional groups, e.g. as a linkage or as components of the repeating units.

In cases in which the divalent binding group A can be distinguished from functional groups of the polymer backbone of P, $P_1$ and $P_2$, m corresponds to a value of 1.

Where the divalent binding groups A cannot be distinguished from the functional groups of the polymer backbone, m corresponds to a value of 0. The index m therefore provides information regarding not the presence of the divalent binding group A, but whether it can be distinguished from the structure of the polymer backbone.

The ratio of functional groups D to functional groups C is particularly preferably between 2:1 and 1.3:1. By selecting these advantageous ratios, a low excess of compounds with functional groups D to polymers P', P''' with functional groups C can be achieved in relation to the groups D and C. Ideally, however, a small excess of compounds with functional groups D is used in order to react the terminal groups C of the polymers P' and P''' as completely as possible, thus obtaining the polymers P, $P_1$ and $P_2$. Advantageously, the compounds with the groups D are used in excess because it is easier to remove a low-molecular-weight compound, such as e.g. one with groups D, from the reaction product than polymers P' or P''' in which not all groups C have been reacted.

Another production method for the production of the polymers P, $P_1$ and $P_2$ according to the invention starts from polymers P' or P''' with ethylenically unsaturated end groups C. In this case, the group D of the compound (III) or (IV) signifies a hydrogen atom. Reactions of this type are generally carried out at temperatures of 30 to 150° C., preferably 60 to 120° C., over several hours in the presence of a catalyst. Suitable catalysts are platinum, rhodium, cobalt, palladium or nickel compounds. Platinum catalysts such as platinum metal, platinum chloride and chloroplatinic acid are preferred.

The present invention also provides a curable composition which can be produced by one of the methods according to the invention. These compositions are distinguished by high elasticity, flexibility and extensibility with reasonable setting and cure times.

The present invention also provides a preparation which contains the curable composition according to the invention or a composition produced by one of the methods according to the invention. These preparations encompass compositions which possess improved elastic properties and improved resilience. Moreover, they have a sufficiently long processing time and yet cure rapidly. The preparations according to the invention can contain other substances with which they can be adapted further with a view to the desired application.

According to another preferred embodiment of the preparation according to the invention, this additionally contains at least one compound selected from the group encompassing plasticizers, stabilizers, antioxidants, catalysts, fillers, thinners or reactive thinners, drying agents, adhesion promoters and UV stabilizers, fungicides, flame retardants, pigments, rheological additives and/or solvents.

It is also conceivable for the viscosity of the adhesive or sealant according to the invention to be too high for particular applications. This can then be reduced adjusted simply and usefully by using a reactive thinner without the occurrence of separation phenomena (e.g. plasticizer migration) in the cured material.

The reactive thinner preferably has at least one functional group which reacts e.g. with moisture or atmospheric oxygen after application. Examples of such groups are silyl groups, isocyanate groups, vinylically unsaturated groups and polyunsaturated systems.

As reactive thinner it is possible to use all compounds that are miscible with the adhesive or sealant while reducing the viscosity and have at least one group that is reactive with the binder.

The viscosity of the reactive thinner is preferably less than 20,000 mPas, particularly preferably about 0.1-6,000 mPas, most particularly preferably 1-1000 mPas (Brookfield RVT, 23° C., spindle 7, 10 rpm).

As reactive thinner it is possible to use e.g. the following substances: polyalkylene glycols reacted with isocyanatosilanes (e.g. Synalox 100-50B, DOW), carbamatopropyl trimethoxysilane, alkyl trimethoxysilane, alkyl triethoxysilane, such as methyl trimethoxysilane, methyl triethoxysilane and vinyl trimethoxysilane (Geniosil XL 10, Wacker), vinyl triethoxysilane, phenyl trimethoxysilane, phenyl triethoxysilane, octyl trimethoxysilane, tetraethoxy-silane, vinyl dimethoxymethyl silane (XL12, Wacker), vinyl triethoxysilane (GF56, Wacker), vinyl triacetoxysilane (GF62, Wacker), isooctyl trimethoxysilane (IO Trimethoxy), isooctyl triethoxysilane (IO Triethoxy, Wacker), N-trimethoxysilylmethyl-O-methylcarbamate (XL63, Wacker), N-dimethoxy-(methyl)silylmethyl-O-methylcarbamate (XL65, Wacker), hexadecyl trimethoxysilane, 3-octanoylthio-1-propyl triethoxysilane and partial hydrolyzates of these compounds.

Furthermore, the following polymers from Kaneka Corp. can also be used as reactive thinners: MS S203H, MS S303H, MS SAT 010 and MS SAX 350.

It is also possible to use silane-modified polyethers, which are derived e.g. from the reaction of isocyanatosilane with Synalox grades.

Moreover, polymers which can be produced from an organic backbone by grafting with a vinyl silane or by reaction of polyol, polyisocyanate and alkoxysilane can be used as reactive thinners.

The term polyol is understood to be a compound that can contain one or more OH groups in the molecule. The OH groups can be either primary or secondary.

The suitable aliphatic alcohols include for example ethylene glycol, propylene glycol and higher glycols, as well as other polyfunctional alcohols. The polyols can additionally contain other functional groups such as e.g. esters, carbonates or amides.

For the production of the reactive thinners which are preferred according to the invention, the appropriate polyol component is reacted in each case with an at least bifunctional isocyanate. Any isocyanate with at least two isocyanate groups is suitable in principle as the at least bifunctional isocyanate, but within the framework of the present invention, compounds with two to four isocyanate groups, particularly with two isocyanate groups, are preferred.

The compound present as reactive thinner within the framework of the present invention preferably has at least one alkoxysilyl group, with the di- and trialkoxysilyl groups being preferred among the alkoxysilyl groups.

Suitable polyisocyanates for the production of a reactive thinner are for example ethylene diisocyanate, 1,4-tetramethylene diisocyanate, 1,4-tetramethoxybutane diisocyanate, 1,6-hexamethylene diisocyanate (HDI), 1,3-cyclobutane diisocyanate, 1,3- and 1,4-cyclohexane diisocyanate, bis(2-isocyanatoethyl) fumarate, and mixtures of two or more thereof, 1-isocyanato-3,3,5-trimethyl-5-isocyanatomethyl-cyclohexane (isophorone diisocyanate, IPDI), 2,4- and 2,6-hexahydrotoluoylene diisocyanate, hexahydro-1,3- or -1,4-phenylene diisocyanate, benzidine diisocyanate, 1,5-naphthalene diisocyanate, 1,6-diisocyanato-2,2,4-trimethylhexane, 1,6-diisocyanato-2,4,4-trimethyl-hexane, xylylene diisocyanate (XDI), tetramethylxylylene diisocyanate (TMXDI), 1,3- and 1,4-phenylene diisocyanate, 2,4- or 2,6-toluene diisocyanate (TDI), 2,4''-diphenylmethane diisocyanate, 2,2''-diphenylmethane diisocyanate or 4,4'-diphenylmethane diisocyanate (MDI) or the partially or completely hydrogenated cycloalkyl derivatives thereof, for example completely hydrogenated MDI (H12-MDI), alkyl-substituted diphenylmethane diisocyanates, for example mono-, di-, tri- or tetraalkyl diphenylmethane diisocyanate and the partially or completely hydrogenated cycloalkyl derivatives thereof, 4,4'-diisocyanatophenyl perfluoroethane, phthalic acid bis-isocyanatoethyl ester, 1-chloromethylphenyl 2,4- or 2,6-diisocyanate, 1-bromomethylphenyl 2,4- or 2,6-diisocyanate, 3,3-bischloromethyl ether 4,4'-diphenyl diisocyanate, sulfurous diisocyanates, as are obtainable by reaction of 2 mol diisocyanate with 1 mol thiodiglycol or dihydroxydihexyl sulfide, the di- and triisocyanates of the di- and timer fatty acids, or mixtures of two or more of the above diisocyanates.

Tri- or polyvalent isocyanates, as are obtainable for example by oligomerization of diisocyanates, particularly by oligomerization of the above-mentioned isocyanates, can also be used as polyisocyanates. Examples of these tri- and polyvalent polyisocyanates are the triisocyanurates of HDI or IPDI or mixtures thereof or mixed triisocyanurates thereof as well as polyphenylmethylene polyisocyanate, as is obtainable by phosgenation of aniline-formaldehyde condensation products.

To reduce the viscosity of the preparation according to the invention, in addition to or instead of a reactive thinner it is also possible to use solvents and/or plasticizers.

Aliphatic or aromatic hydrocarbons, halogenated hydrocarbons, alcohols, ketones, ethers, esters, ester alcohols, keto alcohols, keto ethers, keto esters and ether esters are suitable as solvents. Preferably, however, alcohols are used as this results in increased storage stability. $C_1$-$C_{10}$ alcohols, particularly methanol, ethanol, i-propanol, isoamyl alcohol and hexanol, are preferred.

The preparation according to the invention can also contain hydrophilic plasticizers. These serve to improve moisture absorption and thus to improve reactivity at low temperatures. Suitable plasticizers are, for example, esters of abietic acid, adipic acid esters, azelaic acid esters, benzoic acid esters, butyric acid esters, acetic acid esters, esters of higher fatty acids with about 8 to about 44 C atoms, esters of fatty acids carrying OH groups or epoxidized fatty acids, fatty acid esters and fats, glycolic acid esters, phosphoric acid esters, phthalic acid esters, linear or branched alcohols containing from 1 to 12 C atoms, propionic acid esters, sebacic acid esters, sulfonic acid esters such as e.g. $C_{10}$-$C_{21}$ alkanesulfonic acid phenyl esters (Mesamoll, Bayer), thiobutyric acid esters, trimellitic acid esters, citric add esters and esters based on nitrocellulose and polyvinyl acetate, as well as mixtures of two or more thereof. Particularly suitable are the asymmetric esters of adipic acid monooctyl ester with 2-ethylhexanol (Edenol DOA, Cognis Deutschland GmbH, Düsseldorf).

Suitable among the phthalic acid esters are, for example, dioctyl phthalate, dibutyl phthalate, diisoundecyl phthalate or butylbenzyl phthalate; among the adipates dioctyl adipate, diisodecyl adipate, diisodecyl succinate, dibutyl sebacate or butyl oleate.

Also suitable as plasticizers are the pure or mixed ethers of monofunctional, linear or branched $C_{4-16}$ alcohols or mixtures of two or more different ethers of such alcohols, for example dioctyl ether (obtainable as Cetiol OE, Cognis Deutschland GmbH, Düsseldorf).

Furthermore, end-capped polyethylene glycols are suitable as plasticizers. For example polyethylene or polypropylene glycol di-$C_{1-4}$-alkyl ethers, particularly the dimethyl or diethyl ethers of diethylene glycol or dipropylene glycol, and mixtures of two or more thereof.

However, end-capped polyethylene glycols, such as polyethylene or polypropylene glycol dialkyl ethers wherein the alkyl residue has one to four C atoms, and particularly the dimethyl and diethyl ethers of diethylene glycol and dipropylene glycol, are particularly preferred. With dimethyldiethylene glycol in particular, even under relatively unfavorable application conditions (low atmospheric humidity, low temperature) an acceptable cure is achieved. For further details on plasticizers, reference is made to the relevant literature on industrial chemistry.

Also suitable as plasticizers within the framework of the present invention are diurethanes, which can be produced for example by reacting diols having OH end groups with monofunctional isocyanates by selecting the stoichiometry such that substantially all free OH groups react fully. Any excess isocyanate can then be removed from the reaction mixture, for example by distillation. Another method for the production of diurethanes consists in reacting monofunctional alcohols with diisocyanates, all the NCO groups reacting as fully as possible.

As catalysts for controlling the cure rate of the curable compositions according to the invention, for example organometallic compounds such as iron or tin compounds are suitable, in particular the 1,3-dicarbonyl compounds of iron or of divalent or tetravalent tin, the tin(II) carboxylates or the dialkyltin(IV) dicarboxylates or the corresponding dialkoxylates, e.g. dibutyltin dilaurate, dibutyltin diacetate, dioctyltin diacetate, dibutyltin maleate, tin(II) octoate, tin(II) phenolate or the acetylacetonates of divalent or tetravalent tin. In addition, it is also possible to use alkyl titanates, organosilicon titanium compounds or bismuth tris-2-ethylhexanoate, acidic compounds such as phosphoric acid, p-toluenesulfonic acid or phthalic acid, aliphatic amines such as butyl-, hexyl-, octyl-, decyl- or laurylamine, aliphatic diamines such as e.g. ethylenediamine, hexyldiamine or also aliphatic polyamines such as diethylenetriamine, triethylenetetramine, tetraethylenepentamine, heterocyclic N compounds, e.g. piperidine, piperazine, aromatic amines such as m-phenylenediamine, ethanolamine, triethylamine and other curing catalysts for epoxides.

The following tin compounds are also suitable: di(n-butyl) tin(IV) di(methyl maleate), di(n-butyl)tin(IV) di(butyl maleate), di(n-octyl)tin(IV) di(methyl maleate), di(n-octyl)tin (IV) di(butyl maleate), di(n-octyl)tin(IV) di(isooctyl maleate), di(n-butyl)tin(IV) sulfide, di(n-butyl)tin(IV) oxide, di(n-octyl)tin(IV) oxide, (n-butyl)$_2$Sn(SCH$_2$COO), (n-octyl)$_2$Sn(SCH$_2$COO), (n-octyl)$_2$Sn(SCH$_2$CH$_2$COO), (n-octyl)$_2$Sn(SCH$_2$CH$_2$COOCH$_2$CH$_2$OCOCH$_2$S), (n-butyl)$_2$Sn(SCH$_2$COO-i-C$_8$H$_{17}$)$_2$, (n-octyl)$_2$Sn (SCH$_2$COO-i-C$_8$H$_{17}$)$_2$, (n-octyl)$_2$Sn(SCH$_2$COO-n-C$_8$H$_{17}$)$_2$.

Chelating tin organyls can also be used, e.g. di(n-butyl)tin (IV) di(acetylacetonate), di(n-octyl)tin(IV) di(acetylacetonate), (n-octyl)(n-butyl)tin(IV) di(acetylacetonate).

The organotin compounds in particular are tried and tested, readily available catalysts having excellent activity. However, some tin organyls have come under criticism owing to physiological and ecological objections. In another preferred embodiment, therefore, the curable composition according to the invention is tin-free. Nevertheless, the composition according to the invention can be cured well and rapidly using alternative catalysts with no loss of quality.

Boron halides such as boron trifluoride, boron trichloride, boron tribromide, boron triiodide or mixed boron halides can also be used as curing catalysts. Boron trifluoride complexes such as e.g. boron trifluoride-diethyl etherate (CAS No. [109-63-7]), which as liquids are easier to handle than the gaseous boron halides, are particularly preferred.

1,8-Diazabicyclo-[5.4.0]-undec-7-ene (DBU) is also suitable as a catalyst for the composition according to the invention.

In addition, titanium, aluminum and zirconium compounds or mixtures of one or more catalysts from one or more of the groups just mentioned can preferably be used as catalysts. These catalysts are suitable as curing catalysts for the alkoxysilane polymers. On the one hand, this makes it possible to avoid the use of tin compounds and on the other hand, better adhesion to normally poorly adhering organic surfaces such as e.g. acrylates can be improved in this way. Among the titanium, aluminum and zirconium catalysts, the titanium catalysts are preferably used since the best curing results are achieved with these.

Suitable as titanium catalysts are compounds which have hydroxy groups and/or substituted or unsubstituted alkoxy groups, i.e. titanium alkoxides of the general formula

wherein R$^z$ is an organic group, preferably a substituted or unsubstituted hydrocarbon group with 1 to 20 C atoms, and the 4 alkoxy groups —OR$^z$ are the same or different. Furthermore, one or more of the residues —OR$^z$ can be replaced by acyloxy groups —OCOR$^z$.

Also suitable as titanium catalysts are titanium alkoxides in which one or more alkoxy groups are replaced by halogen atoms.

It is also possible to use titanium chelate complexes.

Aluminum catalysts can also be used as curing catalysts, e.g. aluminum alkoxides

wherein R$^z$ signifies an organic group, preferably a substituted or unsubstituted hydrocarbon residue with 1 to 20 C atoms and the three residues R$^z$ are the same or different.

In the case of the aluminum alkoxides too, one or more of the alkoxy residues can also be replaced by acyloxy residues —OC(O)R$^z$.

Furthermore, it is possible to use aluminum alkoxides in which one or more alkoxy residues are replaced by halogen groups.

Among the aluminum catalysts described, the pure aluminum alcoholates are preferred in view of their stability towards moisture and the curability of the mixtures to which they are added. Aluminum chelate complexes are also preferred.

Suitable zirconium catalysts are: tetramethoxyzirconium and tetraethoxyzirconium. Diisopropoxyzirconium bis(ethylacetoacetate), triisopropoxyzirconium (ethylacetoacetate) and isopropoxyzirconium tris(ethylacetoacetate) can most particularly preferably.

Furthermore it is also possible to use for example zirconium acylates.

Halogenated zirconium catalysts can also be used.

Furthermore it is also possible to use zirconium chelate complexes.

In addition, carboxylic acid salts of metals or a mixture of several of such salts can be used as curing catalysts, these being selected from the carboxylates of the following metals: calcium, vanadium, iron, titanium, potassium, barium, manganese, nickel, cobalt and/or zirconium. Among the carboxylates, the calcium, vanadium, iron, titanium, potassium, barium, manganese and zirconium carboxylates are preferred as they exhibit high activity. Particularly preferred are calcium, vanadium, iron, titanium and zirconium carboxylates. Most particularly preferred are iron and titanium carboxylates.

The catalyst, preferably mixtures of several catalysts, is preferably used in a quantity of 0.001 to about 5 wt. %, based on the total weight of the preparation. Percentages by weight of 0.01 to 1 are preferred, in particular 0.03 to 0.5, particularly preferably less than 0.1 wt. % catalyst, based on the total weight of the preparation.

The preparation according to the invention can also contain up to about 20 wt. % of conventional adhesion promoters (tackifiers). The term "adhesion promoter" is understood to mean a substance which improves the adhesion properties of adhesive layers on surfaces. One or more adhesion promoters can be contained. Suitable as adhesion promoters are for example resins, terpene oligomers, coumarone-indene resins, aliphatic, petrochemical resins and modified phenolic resins. Within the framework of the present invention, for example hydrocarbon resins, as are obtained by polymerization of terpenes, mainly α- or β-pinene, dipentene or limonene, are suitable. The polymerization of these monomers generally takes place cationically with initiation using Friedel-Crafts catalysts. The terpene resins also include for example copolymers of terpenes and other monomers, for example styrene, α-methylstyrene, isoprene and the like. These resins are used for example as adhesion promoters for pressure-sensitive adhesives and coating materials. Also suitable are the terpene-phenolic resins which are produced by acid-catalyzed addition of phenols to terpenes or rosin. Terpene-phenolic resins are soluble in most organic solvents and oils, and miscible with other resins, waxes and rubber. Also suitable as an additive in the aforementioned sense within the framework of the present invention are the rosin resins and derivatives thereof, for example esters or alcohols thereof.

Particularly suitable are silane adhesion promoters, in particular alkoxysilanes, with a (further) functional group such as e.g. an amino group, a mercapto group, an epoxy group, a carboxyl group, a vinyl group, an isocyanate group, an isocyanurate group or a halogen. Examples are γ-mercaptopropyl trimethoxysilane, γ-mercaptopropyl triethoxysilane, γ-mercaptopropylmethyl dimethoxysilane, γ-glycidoxypropyl trimethoxysilane, γ-glycidoxypropyl triethoxysilane, γ-glycidoxypropylmethyl dimethoxysilane, β-carboxyethyltriethoxysilane, β-carboxyethylphenyl bis(2-methoxyethoxy)silane, N-β-(carboxymethyl)aminoethyl-γ-aminopropyl trimethoxysilane, vinyl trimethoxysilane, vinyl triethoxysilane, γ-acryloxypropyl methyl triethoxysilane, γ-isocyanatopropyl trimethoxysilane, γ-isocyanatopropyl triethoxysilane, γ-isocyanatopropylmethyl diethoxysilane, γ-isocyanatopropylmethyl dimethoxy-silane, tris(trimethoxysilyl) isocyanurate and γ-chloropropyl trimethoxysilane.

Particularly preferred as adhesion promoters are in particular aminosilanes (amino-functional alkoxysilanes or aminoalkyl alkoxysilanes), such as e.g. γ-aminopropyl trimethoxysilane, γ-aminopropyl triethoxysilane, γ-aminopropyl triisopropoxysilane, γ-aminopropylmethyl dimethoxysilane, γ-aminopropylmethyl diethoxysilane, γ-(2-aminoethyl)-3-aminopropyl trimethoxysilane, γ-(2-aminoethyl)aminopropylmethyl dimethoxysilane, γ-(2-aminoethyl)-aminopropyl triethoxysilane, γ-(2-aminoethyl) aminopropylmethyl diethoxysilane, γ-(2-aminoethyl) aminopropyl triisopropoxysilane, N-phenyl-γ-aminopropyl trimethoxysilane, N-benzyl-γ-aminopropyl trimethoxysilane and N-vinylbenzyl-γ-aminopropyl triethoxysilane, or oligomeric aminosilanes, such as e.g. aminoalkyl group-modified alkyl polysiloxane (Dynasylan 1146).

Furthermore, the preparation according to the invention can additionally contain up to about 7 wt. %, particularly up to about 5 wt. % antioxidants.

The preparation according to the invention can contain up to about 2 wt. %, preferably about 1 wt. % of UV stabilizers. Particularly suitable as UV stabilizers are the so-called Hindered Amines Light Stabilizers (HALS). Within the framework of the present invention, it is preferred if a UV stabilizer is used which carries a silyl group and is incorporated into the end product during crosslinking or curing. Particularly suitable for this purpose are the products Lowilite 75 and Lowilite 77 (Great Lakes, USA). Furthermore, it is also possible to add benzotriazoles, benzophenones, benzoates, cyanoacrylates, acrylates, sterically hindered phenols, phosphorus and/or sulfur.

It is often meaningful to stabilize the preparations according to the invention further against penetrating moisture using drying agents in order to increase the storage stability (shelf life) still further.

Such an improvement in shelf life can be achieved for example by the use of drying agents. Suitable drying agents are all compounds which react with water to form a group that is inert towards the reactive groups present in the preparation while undergoing the smallest possible changes to their molecular weight. In addition, the reactivity of the drying agents towards moisture that has penetrated into the preparation must be higher than the reactivity of the end groups of the polymer carrying silyl groups according to the invention which is present in the preparation.

Isocyanates, for example, are suitable as drying agents.

It is also conceivable to use isocyanatosilanes in a small excess, approximately in a ratio of 1.3:1, as the compound with the functional group D. If excess isocyanatosilane remains in the preparation from the reaction of the polymer with the compound (III) or (IV), this can be used directly as a drying agent.

Advantageously, however, silanes are used as drying agents. For example vinyl silanes, such as 3-vinylpropyl triethoxysilane, oxime silanes, such as methyl-O,O',O''-butan-2-one trioximosilane or O,O''', O'''-butan-2-one tetraoximosilane (CAS No. 022984-54-9 and 034206-40-1) or benzamidosilanes such as bis(N-methylbenzamido)methyl ethoxysilane (CAS No. 16230-35-6) or carbamatosilanes such as carbamatomethyl trimethoxysilane. However, the use of methyl, ethyl or vinyl trimethoxysilane, tetramethyl or tetraethyl ethoxysilane is also possible. Particularly preferred here are vinyl trimethoxysilane and tetraethoxysilane in terms of efficiency and costs Also suitable as drying agents are the aforementioned reactive thinners, provided that they have a molecular weight (Mn) of less than about 5,000 g/mol and contain end groups, the reactivity of which towards penetrating moisture is at least as great as, preferably greater than, the reactivity of the reactive groups of the polymer carrying silyl groups according to the invention.

Finally, alkyl orthoformates or orthoacetates can also be used as drying agents, e.g. methyl or ethyl orthoformate, methyl or ethyl orthoacetate.

The adhesives and sealants according to the invention generally contain about 0 to about 6 wt. % drying agents.

The preparation according to the invention can additionally contain fillers. Suitable here are, for example, chalk, lime powder, precipitated and/or pyrogenic silica, zeolites, bentonites, magnesium carbonate, kieselguhr, alumina, clay, tallow, titanium oxide, iron oxide, zinc oxide, sand, quartz, flint, mica, glass powder and other ground minerals. In addition, it is also possible to use organic fillers, in particular carbon black, graphite, wood fibers, wood flour, wood shavings, cellulose, cotton, pulp, cotton, wood chips, chopped straw, chaff, ground walnut shells and other short cut fibers. Furthermore, short fibers such as glass fibers, glass filament, polyacrylonitrile, carbon fibers, Kevlar fibers or polyethylene fibers can also be added. Aluminum powder is also suitable as a filler.

The pyrogenic and/or precipitated silicas advantageously have a BET surface area of 10 to 90 $m^2/g$, particularly of 35 to 65 $m^2/g$. When used, they do not cause any additional increase in the viscosity of the preparation according to the invention but contribute to a strengthening of the cured preparation.

A highly disperse silica with a BET surface area of 45 to 55 $m^2/g$ is particularly preferably used, particularly with a BET surface area of about 50 $m^2/g$. These silicas have the additional advantage of an incorporation time 30 to 50% shorter compared with silicas with a higher BET surface area. Another advantage lies in the fact that the aforesaid highly disperse silica can be incorporated into silane-terminated adhesives, sealants or coating materials in a considerably higher concentration without the flow properties of the adhesives, sealants or coating materials being impaired.

It is also conceivable to use pyrogenic and/or precipitated silicas with a higher BET surface area, advantageously with 100-250 $m^2/g$, particularly 110-170 $m^2/g$, as filler. Owing to the higher BET surface area, the same effect, e.g. reinforcement of the cured preparation, can be achieved with a lower proportion by weight of silica. Thus it is possible to use additional substances to improve the preparation according to the invention in terms of other requirements.

Furthermore, hollow spheres with a mineral shell or a plastic shell are suitable as fillers. These can be for example hollow glass spheres which are commercially available with the trade names Glass Bubbles®. Plastic-based hollow spheres are obtainable e.g. with the trade names Expancel® or Dualite®. These are composed of inorganic or organic substances, each having a diameter of 1 mm or less, preferably of 500 µm or less.

For some applications, fillers are preferred which endow the preparations with thixotropic properties. Such fillers are also described as rheological additives or auxiliary agents, e.g. silica gels, aerosils, charcoal, carbon black or swellable plastics such as PVC. Furthermore, the following organic additives can be used as rheological modifiers: hydrogenated castor oil, fatty acid amides, urea derivatives and polyurea derivatives. In order to be readily expressed from a suitable metering device (e.g. tube or cartridge), these preparations possess a viscosity of 3,000 to 15,000, preferably 40,000 to 80,000 mPas or 50,000 to 60,000 mPas.

The fillers are preferably used in a quantity of 1 to 80 wt. % based on the total weight of the preparation.

The production of the preparation according to the invention takes place according to known methods by intimate mixing of the components in suitable dispersing apparatus, e.g. a high-speed mixer.

The present invention also provides the use of the composition according to the invention or of the preparation according to the invention as an adhesive, sealant or knifing filler, and for the production of moldings. Another area of application for the compositions according to the invention is their use as plugging compound, hole filler or crack filler.

The compositions and preparations according to the invention are thus suitable for bonding plastics, metals, glass, ceramics, wood, timber-based materials, paper, paper-based materials, rubber and textiles, for the bonding of floors, sealing of building elements, windows, wall and floor coverings and joints in general. The materials here can in each case be bonded with themselves or with one another in any combinations.

A preferred embodiment of the preparation according to the invention can contain:

- 5 to 50 wt. %, preferably 10 to 40 wt. % of one or more compounds of the compositions according to the invention,
- 0 to 30 wt. %, particularly less than 20 wt. %, particularly preferably less than 10 wt. % plasticizers; e.g. 0.5-30, particularly 1-25 wt. % plasticizers
- 0 to 80 wt. %, preferably 20 to 60 wt. %, particularly preferably 30 to 55 wt. % fillers.

Furthermore, the embodiment can contain other auxiliary substances, e.g. 0-10 wt. %, particularly 0.5-5 wt. %.

The totality of all components adds up to 100 wt. %, but the sum of just the main components listed above does not have to add up to 100 wt. %.

The invention is explained in more detail below on the basis of exemplary embodiments and production specifications.

EXAMPLES & PRODUCTION SPECIFICATIONS

Examples

Polymer I (Exclusively γ-trimethoxysilyl Functionalization)

328 g (18 mmol) polypropylene glycol 18000 (OH number=6.2) (Acclaim 18200 N, Bayer MaterialScience AG, 51368 Leverkusen) are dried in a 500 ml three-neck flask at 80° C. in vacuo. Then, under a nitrogen atmosphere at 80° C., 0.07 g dibutyltin dilaurate and 8 g (44 mmol) 3-isocyanatopropyl trimethoxysilane are added and the mixture is stirred for one hour at 80° C. The resulting prepolymer mixture is cooled and 7.0 g N-trimethoxysilylmethyl-O-methylcarbamate (Geniosil XL 63, CAS No: [23432-64-6], Wacker Chemie AG, D-81737 Munich) and 5.3 g of a mixture (Tinuvin 765, Ciba Spec. Chem., D-68623 Lampertheim) of 70 wt. % bis(1,2,2,6,6-pentamethyl-4-piperidyl) sebacate and 30 wt. % methyl-1,2,2,6,6-pentamethyl-4-piperidyl sebacate are added.

The product is stored in a moisture-tight manner in a glass vessel under a nitrogen atmosphere before being further processed into a curable composition in accordance with the general specification.

Polymer II (80 wt. % γ-trimethoxy-, 20 wt. % α-trimethoxymethylsilyl Functionalization)

328 g (18 mmol) polypropylene glycol 18000 (OH number=6.2) are dried in a 500 ml three-neck flask at 80° C. in vacuo. Then, under a nitrogen atmosphere at 80° C., 0.07 g dibutyltin dilaurate, 7.5 g (35 mmol) 3-isocyanatopropyl trimethoxysilane and 1.6 g (9 mmol) 1-isocyanatomethyl trimethoxysilane (Geniosil XL 43, CAS No. 78450-75-6, Wacker Chemie AG, D-81737 Munich) are added and the mixture is stirred for one hour at 80° C. The resulting prepolymer mixture is cooled and 7.0 g Geniosil XL 63 and 5.3 g of a mixture (Tinuvin 765) of 70 wt. % bis(1,2,2,6,6-pentamethyl-4-piperidyl) sebacate and 30 wt. % methyl-1,2,2,6,6-pentamethyl-4-piperidyl sebacate are added.

The product is stored in a moisture-tight manner in a glass vessel under a nitrogen atmosphere before being further processed into a curable composition in accordance with the general specification.

Polymer III (50 wt. % γ-trimethoxy-, 50 wt. % α-trimethoxymethylsilyl Functionalization)

330 g (18 mmol) polypropylene glycol 18000 (OH number=6.2) are dried in a 500 ml three-neck flask at 80° C. in vacuo. Then, under a nitrogen atmosphere at 80° C., 0.07 g dibutyltin dilaurate, 4.7 g (22 mmol) 3-isocyanatopropyl trimethoxysilane and 4 g (22 mmol) 1-isocyanatomethyl trimethoxysilane (Geniosil XL 43) are added and the mixture is stirred for one hour at 80° C.

The resulting prepolymer mixture is cooled and 7.0 g Geniosil XL 63 and 5.3 g of a mixture (Tinuvin 765) of 70 wt. % bis(1,2,2,6,6-pentamethyl-4-piperidyl) sebacate and 30 wt. % methyl-1,2,2,6,6-pentamethyl-4-piperidyl sebacate are added.

The product is stored in a moisture-tight manner in a glass vessel under a nitrogen atmosphere before being further processed into a curable composition in accordance with the general specification.

Polymer IV (20 wt. % γ-trimethoxy-, 80 wt. % α-trimethoxymethylsilyl Functionalization)

330 g (18 mmol) polypropylene glycol 18000 (OH number=6.2) are dried in a 500 ml three-neck flask at 80° C. in vacuo. Then, under a nitrogen atmosphere at 80° C., 0.07 g dibutyltin dilaurate, 1.9 g (9 mmol) 3-isocyanatopropylmethyl dimethoxysilane and 6.4 g (35 mmol) 1-isocyanatomethyl trimethoxysilane (Geniosil XL 43) are added and the mixture is stirred for one hour at 80° C.

The resulting prepolymer mixture is cooled and 7.0 g Geniosil XL 63 and 5.3 g of a mixture (Tinuvin 765) of 70 wt. % bis(1,2,2,6,6-pentamethyl-4-piperidyl) sebacate and 30 wt. % methyl-1,2,2,6,6-pentamethyl-4-piperidyl sebacate are added.

The product is stored in a moisture-tight manner in a glass vessel under a nitrogen atmosphere before being further processed into a curable composition in accordance with the general specification.

Polymer V (100 wt. % α-trimethoxymethylsilyl Functionalization)

330 g (18 mmol) polypropylene glycol 18000 (OH number=6.2) are dried in a 500 ml three-neck flask at 80° C. in vacuo. Then, under a nitrogen atmosphere at 80° C., 0.07 g dibutyltin dilaurate, 8 g (44 mmol) 1-isocyanatomethyl trimethoxysilane (Geniosil XL 43) are added and the mixture is stirred for one hour at 80° C.

The resulting prepolymer mixture is cooled and 7.0 g Geniosil XL 63 and 5.3 g of a mixture (Tinuvin 765) of 70 wt. % bis(1,2,2,6,6-pentamethyl-4-piperidyl) sebacate and 30 wt. % methyl-1,2,2,6,6-pentamethyl-4-piperidyl sebacate are added.

The product is stored in a moisture-tight manner in a glass vessel under a nitrogen atmosphere, before being further processed into a curable composition in accordance with the general specification.

Polymer VI (50 wt. % γ-trimethoxy-, 50 wt. % α-trimethoxymethylsilyl Functionalization)

325 g (28 mmol) polypropylene glycol 12000 (OH number=9.8) are dried in a 500 ml three-neck flask at 80° C. in vacuo. Then, under a nitrogen atmosphere at 80° C., 0.07 g dibutyltin dilaurate, 7.2 g (34 mmol) 3-isocyanatopropyl trimethoxysilane and 6.3 g (34 mmol) 1-isocyanatomethyl trimethoxysilane (Geniosil XL 43) are added and the mixture is stirred for one hour at 80° C.

The resulting prepolymer mixture is cooled and 7.0 g Geniosil XL 63 and 5.3 g of a mixture (Tinuvin 765) of 70 wt. % bis(1,2,2,6,6-pentamethyl-4-piperidyl) sebacate and 30 wt. % methyl-1,2,2,6,6-pentamethyl-4-piperidyl sebacate are added.

The product is stored in a moisture-tight manner in a glass vessel under a nitrogen atmosphere, before being further processed into a curable composition in accordance with the general specification.

Polymer VII (75 wt. % γ-trimethoxy-, 25 wt. % α-trimethoxymethylsilyl Functionalization)

330 g (18 mmol) polypropylene glycol 12000 (OH number=9.8) are dried in a 500 ml three-neck flask at 80° C. in vacuo. Then, under a nitrogen atmosphere at 80° C., 0.07 g dibutyltin dilaurate, 3.1 g (17 mmol) 3-isocyanatopropylmethyl dimethoxysilane and 10.8 g (51 mmol) 1-isocyanatomethyl trimethoxysilane (Geniosil XL 43) are added and the mixture is stirred for one hour at 80° C.

The resulting prepolymer mixture is cooled and 7.0 g Geniosil XL 63 and 5.3 g of a mixture (Tinuvin 765) of 70 wt. % bis(1,2,2,6,6-pentamethyl-4-piperidyl) sebacate and 30 wt. % methyl-1,2,2,6,6-pentamethyl-4-piperidyl sebacate are added.

The product is stored in a moisture-tight manner in a glass vessel under a nitrogen atmosphere, before being further processed into a curable composition in accordance with the general specification.

Test Conditions for Polymer Films

The polymers were each admixed with 1 wt. % N-aminoethyl-3-aminopropyl trimethoxysilane (Geniosil GF 91, Wacker Chemie AG) and 0.0 or 0.2 wt. % catalyst. The skin forming time (skin over time/SOT) and the time to form a tack-free layer (tack free time I TFT) of these mixtures were determined. In addition, the above-mentioned mixtures were applied in a layer thickness of 2 mm on to glass plates covered with polyether film. After storing for 7 days (23° C., 50% relative humidity), test pieces (S2 specimens) were stamped out from these films and the mechanical data (moduli, elongation, resilience) were determined in accordance with DIN EN 27389 and DIN EN 28339. E-50 and E-100 refer to the moduli of elasticity for test piece elongations of 50 and 100% respectively.

General Specification for the Production of the Curable Preparations According to the Invention:

From the polymer mixtures produced in the examples, "assembly adhesives" or "superglues" are then produced. For this purpose, the polymer mixture, plasticizers, filler(s), catalyst and silanes are intimately mixed in the quantities given in Tables 2 and 3 (parts by weight) in a Speedmixer for 30 s. The following were used, inter alia: silica with a BET surface area of 50±15 m$^2$/g (Aerosil OX 50), Dynasilan PTMO (propyl trimethoxysilane), 3-aminopropyl trimethoxysilane (Geniosil GF 96), ultra-fine, surface-treated, natural calcium carbonate with a high specific surface area (Omyabond 302).

Evaluation

It can be taken from the results in Table 1 that the extensibility of polymer films with a physical mixture of differently functionalized silane-crosslinking polymers (II, III, IV) is better than that of those containing only one silane-crosslinking polymer (I, V).

For Examples (II)-(IV) according to the invention, significantly shorter cure times were observed than for the comparative formulation (Ex. I). Particularly high extensibilities are displayed by polymer films according to Examples (II)-(IV). Example (IV) displays both very high extensibility and high breaking strength and tear strength and therefore a particularly advantageous combination of properties. The skin over time (SOT) is too short for many applications in Example V.

It can be seen from the results in Table 2 that the polymer compositions are suitable for the production of rapidly curing "superglues" with a short skin over time and rapid freedom from tack.

In Table 3, results of assembly adhesive preparations are compiled. Here too, the polymer compositions used according to the invention (Examples 6 and 7) have more balanced properties compared with the prior art (Example 5): broad adhesion spectrum in bonds of different substrates, rapid skin over time, low modulus of elasticity.

TABLE 1

|  | Polymer films | | | | |
| --- | --- | --- | --- | --- | --- |
|  | Polymer I | Polymer II | Polymer III | Polymer IV | Polymer V |
| Viscosity (mPa · s/ 23° C./sp. 7/50 rpm) Film (polymer + 1% GF91 + 0.2% cat) | approx. 30,000 | 33,120 | 32,800 | 38,320 | 38,800 |
| SOT | approx. 15 min | 1 min | 1.5-2.0 min | 1 min | <1 min |
| TFT | n.a. | 50 min | 40 min | 4 min | 2.5 min |
| Catalyst (0.2%) | DBTL | DBU | no cat. | no cat. | no cat. |
| Failure in N/mm$^2$ | 0.62 | 0.64 | 0.69 | 0.70 | 0.76 |
| Elongation in % | 48.90% | 63.58% | 67.22% | 77.54% | 69.34% |
| E-50 N/mm$^2$ | 0.66 | 0.56 | 0.58 | 0.54 | 0.63 |
| E-100 N/mm$^2$ | — | — | — | — | — |

TABLE 2

| | Superglue | | | |
|---|---|---|---|---|
| Example | 1 | 2 | 3 | 4 |
| Polymer VI | 59 | 70 | | |
| Polymer VII | | | 59 | 70 |
| Fillers | | | | |
| Aerosil OX 50 | 15 | 15.5 | 15 | 15.5 |
| Additives | | | | |
| Dynasilan PTMO | 15 | | 15 | |
| Geniosil GF 91 | 10 | 1 | 10 | 1 |
| Geniosil XL 10 | | 7.5 | | 7.5 |
| Geniosil GF 96 | | 5 | | 5 |
| | 99 | 99 | 99 | 99 |
| Results | | | | |
| SOT | 5–10 s | 15 s | 15 min | 10 min |
| TFT in min | <30 | <30 | 45 | 60 |
| Bonded joints [N/mm$^2$] | | | | |
| Wood-wood | 6.21 | 5.68 | 7.24 | 6.69 |
| Wood-aluminum | 5.67 | 4.89 | 6.15 | 5.33 |
| Wood-ABS | 0.85 | 0.51 | 1.35 | 0.90 |
| Aluminum-aluminum | 3.55 | 2.34 | 2.05 | 2.75 |

TABLE 3

| | Assembly adhesive | | |
|---|---|---|---|
| Example | 5 (comparison) | 6 | 7 |
| Polymer I | 27.40 | | |
| Polymer VI | | 27.40 | |
| Polymer VII | | | 27.40 |
| Mesamoll | 15.00 | 15.00 | 15.00 |
| Omyabond 302 | 55.00 | 55.00 | 55.00 |
| VTMO XL 10 | 1.50 | 1.50 | 1.50 |
| AMMO GF 96 | 1.00 | 1.00 | 1.00 |
| Silopren cat. 162 (DBTL) | 0.10 | 0.10 | 0.10 |
| Total | 100.00 | 100.00 | 100.00 |
| Results | | | |
| SOT (conditioning chamber) in min | 24 | immediate | 14 |
| TFT (conditioning chamber) in h | <24 | 3 | <24 |
| Failure in N/mm$^2$ | 3.10 | 2.69 | 2.69 |
| Elongation in % | 138% | 144% | 104% |
| E- 50 N/mm$^2$ | 1.72 | 1.20 | 1.58 |
| E- 100 N/mm$^2$ | 2.75 | 2.11 | 2.61 |
| Strengths after 7 d | | | |
| Wood-wood | 5.04 | 3.22 | 5.0 |
| Wood-aluminum | 2.49 | 2.13 | 3.48 |
| Wood-PMMA | 0.05–0.52 | 0.43 | 0.86 |
| Residual tack | none | none | none |

The invention claimed is:

1. A curable composition encompassing
a) a polymer P with at least two end groups of the following formulae (I) and (II)

$$-A_m-K^1-SiXYZ \quad (I),$$

$$-A_m-K^2-SiXYZ \quad (II),$$

and one or both of
polymers $P_1$ and $P_2$, wherein the polymer $P_1$ has end groups of the following formula (I)

$$-A_m-K^1-SiXYZ \quad (I),$$

and the polymer $P_2$ has end groups of the following formula (II)

$$-A_m-K^2-SiXYZ \quad (II),$$

wherein
A signifies a divalent binding group,
$K^1$, $K^2$ independently of one another denote a divalent aliphatic hydrocarbon group which has a main chain of 1 to 6 carbon atoms, wherein the hydrocarbon groups $K^1$, $K^2$ are different,
X, Y, Z independently of one another denote a hydroxy group or a hydrolyzable group, and
m assumes the values 0 or 1.

2. The composition according to claim 1, wherein $K^2$ has a main chain at least one carbon atom longer than $K^1$.

3. The composition according to claim 1, wherein $K^1$ denotes —CH$_2$— and/or $K^2$ denotes —(CH$_2$)$_3$—.

4. The composition according to claim 1, wherein X, Y and Z each denote a hydrolyzable group selected from —Cl, —O—C(=O)R$^1$, —OR$^1$, wherein R$^1$ denotes a hydrocarbon residue with 1 to 20 C atoms.

5. The composition according to claim 1, wherein X, Y and Z are the same.

6. The composition according to claim 1, wherein the divalent binding group A signifies an amide, carbamate, urea, imino, carboxy, carbonate, thio, mercapto, urethane or sulfonate group or an oxygen or nitrogen atom.

7. The composition according to claim 1, wherein the polymers P, $P_1$, $P_2$ each have a polymer backbone, each of which is selected from alkyd resins, (meth)acrylates and (meth)acrylamides and their salts, phenolic resins, polyalkylenes, polyamides, polycarbonates, polyols, polyethers, polyesters, polyurethanes, vinyl polymers, and copolymers consisting of at least two of the aforementioned classes of polymers.

8. The composition according to claim 7, wherein the molecular weight $M_n$ of the polymer backbone is between 3000 and 50,000 g/mol.

9. A method for the production of the curable composition of claim 1, in which
a) a polymer P' with a polymer backbone having at least two terminal functional groups C and
b) two compounds with functional groups D, which are reactive towards C, of general formulae (III) and (IV),

$$D-K^1-SiXYZ \quad (III)$$

$$D-K^2-SiXYZ \quad (IV),$$

are reacted together,
wherein the substances (III) and (IV) are added to the polymer P' simultaneously during the reaction or first compound (IV) is added and then, at a short interval, compound (III),
wherein C and D are selected from one of the groups —OH, —NHR$^2$, —NH$_2$, —Cl, —Br, —SH and —NCO, —NCS, —C(=O)Cl, —C(=O)OR$^3$
and
C and D do not belong to the same group,
$K^1$, $K^2$ independently of one another denote a divalent aliphatic hydrocarbon group which has a main chain of 1 to 6 carbon atoms, wherein the hydrocarbon groups $K^1$, $K^2$ are different,
X, Y, Z independently of one another denote a hydroxy group or a hydrolyzable group,
$R^2$, $R^3$ each independently of one another denote a hydrocarbon residue with 1 to 20 C atoms.

10. A method for the production of the curable composition of claim 1, in which first a) a polymer P' with a polymer backbone having at least two terminal functional groups C is reacted with the compound (III)

$$D\text{-}K^1\text{—}SiXYZ \qquad (III),$$

separately therefrom b) a polymer P'" with a polymer backbone having at least two terminal functional groups C is reacted with the compound (IV)

$$D\text{-}K^2\text{—}SiXYZ \qquad (IV),$$

and c) then the reaction products from step a) and step b) are mixed together, wherein C and D are selected from one of the groups —OH, —NHR$^4$, —NH$_2$, —Cl, —Br, —SH and —NCO, —NCS, —C(=O)Cl, —C(=O)OR$^5$ and C and D do not belong to the same group, $K^1$, $K^2$ independently of one another denote a divalent aliphatic hydrocarbon group which has a main chain of 1 to 6 carbon atoms, wherein the hydrocarbon groups $K^1$, $K^2$ are different, X, Y independently of one another denote a hydroxy group or a hydrolyzable group, $R^4$, $R^5$ each independently of one another denote a hydrocarbon residue with 1 to 20 C atoms.

11. The method according to claim 9, wherein the method is carried out in a range from 60 to 100° C.

12. The method according to claim 9, wherein the ratio of functional groups D to functional groups C is between 2:1 and 1.3:1.

13. A preparation containing a composition according to claim 1.

14. A curable composition comprising polymer P with at least two end groups of the following formulae (I) and (II)

$$\text{-}A_m\text{-}K^1\text{—}SiXYZ \qquad (I),$$

$$\text{-}A_m\text{-}K^2\text{—}SiXYZ \qquad (II)$$

wherein

A signifies a divalent binding group, $K^1$, $K^2$ independently of one another denote a divalent aliphatic hydrocarbon group which has a main chain of 1 to 6 carbon atoms, wherein the hydrocarbon groups $K^1$, $K^2$ are different, X, Y, Z independently of one another denote a hydroxy group or a hydrolyzable group, and m assumes the values 0 or 1.

15. The curable composition of claim 14 including:

at least one of polymer $P_1$ with end groups of the following formula (I) -$A_m$-$K^1$—SiXYZ; and polymer $P_2$ with end groups of the following formula (II) -$A_m$-$K^2$—SiXYZ.

16. The curable composition of claim 14 including:

polymer $P_1$ with end groups of the following formula -$A_m$-$K^1$—SiXYZ; and polymer $P_2$ with end groups of the following formula -$A_m$-$K^2$—SiXYZ.

* * * * *